(12) United States Patent
Lee

(10) Patent No.: US 11,777,284 B2
(45) Date of Patent: Oct. 3, 2023

(54) PULL-OUT TYPE BURIED UNDERGROUND FIELD MONITORING CONTROL PANEL WITH FLOOD DOUBLE SAFETY STRUCTURE

(71) Applicant: DAESAN ELECTRIC COMMUNICATION CO., LTD., Daegu (KR)

(72) Inventor: Chang Ho Lee, Kyungsangbuk-do (KR)

(73) Assignee: DAESAN ELECTRIC COMMUNICATION CO., LTD., Daegu (KR)

( * ) Notice: Subject to any disclaimer, the term of this patent is extended or adjusted under 35 U.S.C. 154(b) by 0 days.

(21) Appl. No.: 17/850,557

(22) Filed: Jun. 27, 2022

(65) Prior Publication Data

US 2023/0208116 A1 Jun. 29, 2023

(30) Foreign Application Priority Data

Dec. 28, 2021 (KR) ......................... 10-2021-0189190

(51) Int. Cl.
*H02B 7/08* (2006.01)
*H02B 1/28* (2006.01)

(52) U.S. Cl.
CPC ................. *H02B 7/08* (2013.01); *H02B 1/28* (2013.01)

(58) Field of Classification Search
CPC ... H02B 7/08; H02B 1/28; H02B 1/56; H02B 1/54; H02G 3/08; H02G 3/081; H02G 3/088

USPC ............ 174/37, 50, 520; 220/3.2, 3.3, 4.02; 361/600, 601

See application file for complete search history.

(56) References Cited

U.S. PATENT DOCUMENTS

| 3,617,608 A * | 11/1971 | Wisniewski | H02B 7/08 174/37 |
| 4,709,120 A * | 11/1987 | Pearson | H02B 7/08 174/37 |
| 6,304,444 B1 * | 10/2001 | Combs | H01M 10/667 174/16.1 |

(Continued)

FOREIGN PATENT DOCUMENTS

| KR | 10-0998492 B1 | 12/2010 |
| KR | 20150027900 A | 3/2015 |
| KR | 20160098796 A | 8/2016 |

(Continued)

*Primary Examiner* — Angel R Estrada
(74) *Attorney, Agent, or Firm* — NKL LAW; Jae Youn Kim

(57) ABSTRACT

Proposed is a pull-out type buried underground field monitoring control panel with a flood double safety structure, in which it allows to control in a pull-out type manner by burying a control panel for controlling traffic lights, street lights, or water supply pipes in the ground, protect various types of electronic devices from moisture or water in the ground using a double sealing structure based on an air pocket principle, and have a double safety structure against flooding by generating internal pressure at a dangerous time point and applying the pressure to the water flowing into the inner box to push it out of the inner box although the air pocket function is degraded as an abnormal condition occurs in the structure of a "Π" shape due to long-time flooding.

3 Claims, 7 Drawing Sheets

(56) References Cited

U.S. PATENT DOCUMENTS 6,828,502 B2 * 12/2004 Green ................... H02G 9/06
                                                            174/50
7,475,515 B2 *  1/2009 Machledt ............. H02G 9/10
                                                            174/50

FOREIGN PATENT DOCUMENTS

KR           102117887  B1     6/2020
KR           102336857  B1    12/2021

* cited by examiner

PULL-OUT TYPE BURIED UNDERGROUND FIELD MONITORING CONTROL PANEL WITH FLOOD DOUBLE SAFETY STRUCTURE

CROSS REFERENCE TO RELATED APPLICATION

The present application claims the benefit of Korean Patent Application No. 10-2021-0189190 filed in the Korean Intellectual Property Office on Dec. 28, 2021, the entire contents of which are incorporated herein by reference.

BACKGROUND OF THE INVENTION

Field of the Invention

The present invention relates to a pull-out type buried underground field monitoring control panel with a flood double safety structure, and more specifically, a pull-out type buried underground field monitoring control panel with a flood double safety structure, which allows to control in a pull-out type manner by burying a control panel for controlling traffic lights, street lights, or water supply pipes in the ground, protect various types of electronic devices from moisture or water in the ground using a double sealing structure based on an air pocket principle, and have a double safety structure against flooding by generating internal pressure at a dangerous time point and applying the pressure to the water flowing into the inner box to push it out of the inner box although the air pocket function is degraded as an abnormal condition occurs in the structure of a "Π" shape due to long-time flooding.

Background of the Related Art

Generally, a control panel is a device that comprehensively manages and operates various installed electrical facilities, air conditioning facilities, pump facilities, and the like, and is mainly used to control street lights, traffic lights, water supply pressure pumps, drainage pumps, flow meters, and the like. Such a control panel is generally installed on the ground, i.e., on the road, such as a roadside or the like in downtown, in order to prevent flood by rainwater and for the purpose of maintenance.

However, such a control panel installed on the road or on the ground considerably impairs the aesthetics or landscape of a city primarily and may cause traffic disturbances of pedestrians or vehicles. In addition, since control panels are mainly installed on the road or on the ground, it is highly worried that water such as rainwater or the like may infiltrate into the electrical or electronic equipment installed in the control panel, and accordingly, there is a problem in that safety accidents such as electric shock to pedestrians, as well as serious failures of the control panel itself, may occur at any time.

Although a method of burying the control panels under the ground, rather than on the ground, has been proposed recently to solve this problem, control panels of a method of burying underground suggested until present also do not completely block infiltration of water such as rainwater, groundwater or the like, and therefore, it is difficult to reach the stage of practical use.

Accordingly, the applicant of the present invention has proposed a pull-out type buried underground control panel using an air pocket principle through Korean Patent Registration No. 10-2117887, and it is intended to propose a field monitoring control panel having a double safety structure in preparation for flood safety.

(Patent Document 0001) Korean Patent Registration No. 10-0998492

SUMMARY OF THE INVENTION

Therefore, the present invention has been made in view of the above problems, and it is an object of the present invention to provide a pull-out type buried underground field monitoring control panel with a flood double safety structure, which allows to control in a pull-out type manner by burying a control panel for controlling traffic lights, street lights, or water supply pipes in the ground, protect various types of electronic devices from moisture or water in the ground using a double sealing structure based on an air pocket principle, and have a double safety structure against flooding by generating internal pressure at a dangerous time point and applying the pressure to the water flowing into the inner box to push it out of the inner box although the air pocket function is degraded as an abnormal condition occurs in the structure of a "Π" shape due to long-time flooding.

To accomplish the above object, according to one aspect of the present invention, there is provided a pull-out type buried underground field monitoring control panel with a flood double safety structure, the control panel comprising: an enclosure 10 formed and buried in the ground in a shape of a housing having a top side of an open shape and opened and closed by a cover 11, and installed to be positioned on the same horizontal line as the ground; a lower support 20 located on a lower side of an accommodation space 19 of the enclosure 10, formed in a "Π" shape with a closed top side, and vertically moved up and down by a lifting member 81 provided on a bottom side of the enclosure 10; an upright panel 30 fixedly provided in a form of a vertical panel on a top of the lower support 20, wherein an electronic operating device of the control panel including a controller is coupled to a lateral side of the upright panel 30; guide bars 51 vertically provided to be spaced apart from each other on both sides of the upright panel 30 in a horizontal length direction; an inner box 60 provided to slide up and down in the vertical direction along the guide bars 51, wherein as the inner box 60 vertically moves downward along the guide bars 51, the upright panel 30 is protected inside an accommodation unit 60a of the inner box 60, and as the inner box 60 vertically moves upward along the guide bars 51, the upright panel 30 is exposed from the accommodation unit 60a of the inner box 60 so that handling and maintenance of the electronic operating device coupled to the lateral side of the upright panel 30 are possible, and as the inner box 60 is formed in a "Π" shape having an open bottom side and closed lateral and top sides to surround an outer side of the lower support 20 while descending so that an air pocket is formed inside the accommodation unit 60a, inflow of rainwater or groundwater into the inner box 60 is prevented in a state where the inner box 60 has moved to the lower side, and therefore, the electronic operating device of the control panel coupled to the lateral side of the upright panel 30 is protected from moisture or water; a protection panel 99 vertically installed on the lower support 20 inside the inner box 60 to protect the lateral side of the upright panel 30, wherein an upper end of the protection panel 99 is positioned to be higher than an upper end of the upright panel 30; and an air discharge means 90 fixedly provided inside the upper end of the protection panel 99 to push out the water flowing in from a bottom side of the inner box 60 with air pressure when flooding occurs inside the inner box 60, wherein the air discharge means 90 is configured of an air compression tank 91 for storing compressed air, a pressure reducer 92 connected to the inlet and outlet side of the air compression tank 91, a solenoid valve 96 connected to the pressure reducer 92 through a hose 93, a flood detection sensor 98 connected to an electric wire 97 to transfer a flood detection signal to the solenoid valve 96, and an injection nozzle 96*a* connected to the bottom side of the solenoid valve 96 to inject and discharge air toward the inside of the inner box 60, wherein it is configured to raise and lower the inner box 60 by an operation of rods 76 of cylinders 75 by connecting the cylinders 75 in a direction of diagonally crossing hinges 71 to 74 up and down while lower hinges 71 and 72 are provided on both sides of the rear side wall of the lower support 20, and upper hinges 73 and 74 are provided on both sides of the upper portion on the rear side wall of the inner box 60.

In addition, the protection panel 99 is formed in a "ㄷ" shape having open top and front sides and closed rear and both lateral sides, a horizontal support 95 connecting upper end portions on both sides of the protection panel 99 is provided, the air compression tank 91 is fixedly provided on the horizontal support 95, the solenoid valve 96 is fixed on the upright panel 30 tightly attached to a front side of the protection panel 99, and the flood detection sensor 98 is provided to be spaced apart from the bottom side of an upper plate 29 of the lower support 20.

In addition, a side wall 21 of the lower support 20 is formed at a height of 10 to 25 Cm to include: a lower side wall 21*a* extended from the bottom side toward the vertical top side; an inclined side wall 21*b* formed to be inclined upward from the top of the lower side wall 21*a* toward the outside and tightly attached to the inner side of the side wall 61 of the inner box 60; and an extended side wall 21*c* vertically extended from the top of the inclined side wall 21*b* along the side wall 61, wherein as an internal pressurizing space unit 27 is formed between the inclined side wall 21*b* and the lower side wall 21*a*, and the side wall 61 of the inner box 60, the air pocket function is strengthened due to pressurization of the internal pressurizing space unit 27.

In addition, a sealing member 22 is formed to protrude on the outer side of the extended side wall 21*c* facing the side wall body 61, an inward groove unit 21*d* is formed on the extended side wall 21*c* to fix the position of the sealing member 22, and the sealing member 22 is provided to protrude from the inward groove unit 21*d* toward the outside, it is configured to form a through hole on the cover 11, position an antenna capable of communication with the outside in the through hole, and then fill epoxy in the through hole so that the antenna is embedded, and the antenna is configured to be electrically connected to the controller coupled to the lateral side of the upright panel 30 to allow communication from the outside.

According to the present invention, there is an effect of allowing to control in a pull-out type manner by burying a control panel for controlling traffic lights, street lights, or water supply pipes in the ground, protect various types of electronic devices from moisture or water in the ground using a double sealing structure based on an air pocket principle, and have a double safety structure against flooding by generating internal pressure at a dangerous time point and applying the pressure to the water flowing into the inner box to push it out of the inner box although the air pocket function is degraded as an abnormal condition occurs in the structure of a "Π" shape due to long-time flooding.

DETAILED DESCRIPTION OF THE PREFERRED EMBODIMENT

Figure 1:
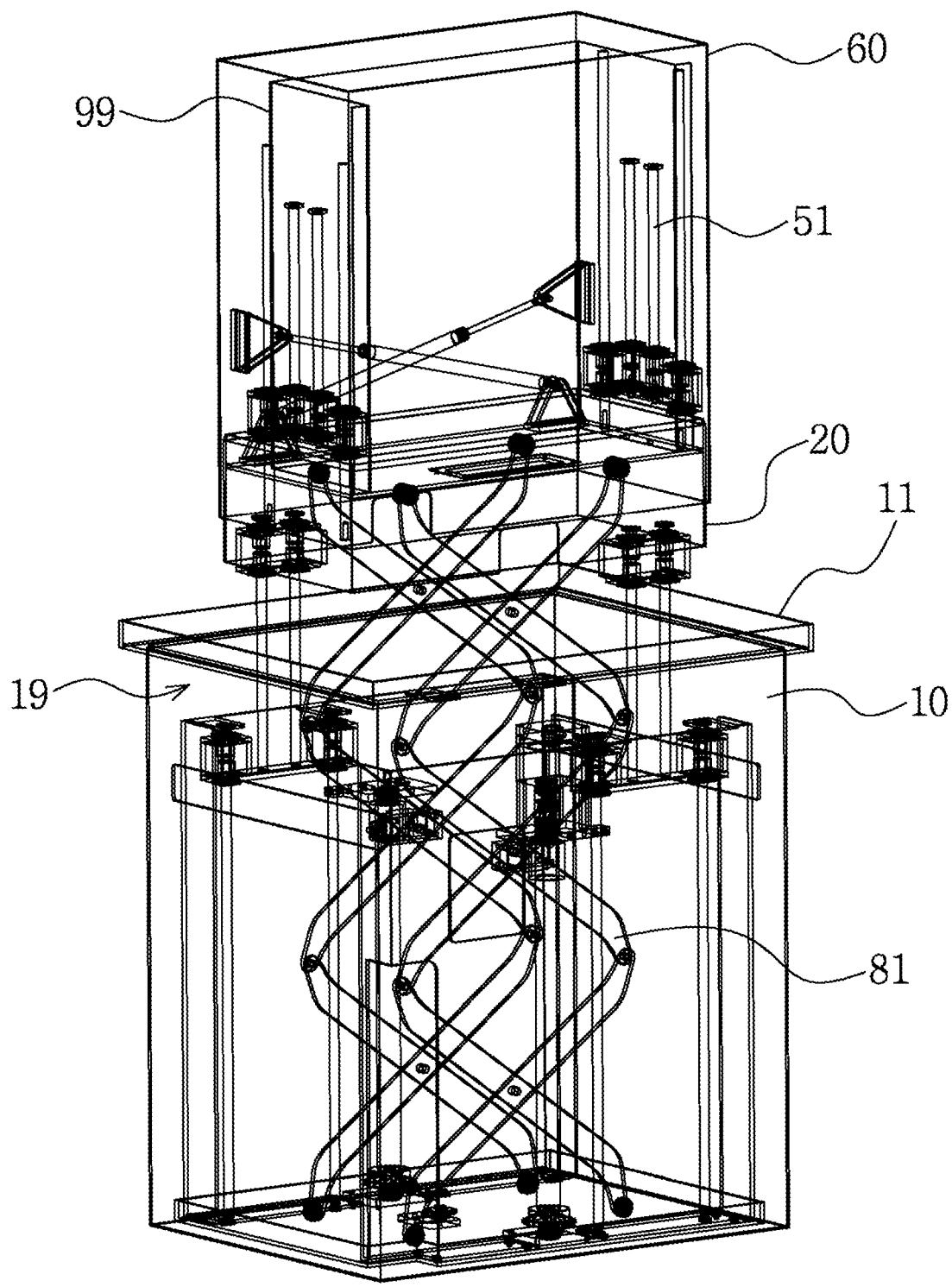
FIG. 1 is a perspective view showing an example of a pull-out type buried underground field monitoring control panel with a flood double safety structure according to the present invention.

Hereinafter, specific details for embodying the present invention will be described in more detail with reference to the accompanying drawings.

The present invention relates to a pull-out type buried underground field monitoring control panel with a flood double safety structure, which allows to control in a pull-out type manner by burying a control panel for controlling traffic lights, street lights, or water supply pipes in the ground, protect various types of electronic devices from moisture or water in the ground using a double sealing structure based on an air pocket principle, and have a double safety structure against flooding by generating internal pressure at a dangerous time point and applying the pressure to the water flowing into the inner box to push it out of the inner box although the air pocket function is degraded as an abnormal condition occurs in the structure of a "Π" shape due to long-time flooding. Referring to FIGS. 1 to 7, the control panel includes an enclosure 10, a lower support 20, guide bars 51, an inner box 60, a protection panel 99, and an air discharge means 90.

For implementation of the present invention, first, as shown in FIG. 1, there is provided an enclosure 10 formed and buried in the ground in the shape of a housing having a top side of an open shape and being opened and closed by a cover 11. The top side of the cover 11 of the enclosure 10 is installed to be positioned on the same horizontal line as the ground to perform the function of an underground buried type control panel.

The cover 11 is generally manufactured by casting, and although not shown, it is preferable to form a through hole on the cover 11, install an antenna capable of communicating with the outside in the through hole, and then fill epoxy around the antenna in the through hole so that the antenna is embedded therein. At this point, the antenna is configured to be electrically connected to the controller coupled to the lateral side of an upright panel 30 described below to allow communication from the outside of the control panel.

In addition, various synthetic resin materials may be used in addition to the epoxy filled in the through hole, and it is preferable that the through hole is formed in a wide-top narrow-bottom shape to have a bearing capacity with respect to the load of the epoxy and the antenna, in addition to stable seating of the epoxy.

A lower support 20 is provided on the lower side of the accommodation space 19 of the enclosure 10. The lower support 20 is configured to vertically move up and down by a lifting member 81 provided on the bottom side of the enclosure 10 as shown in FIGS. 1 and 2. At this point, although the lifting member 81 is shown to be formed in a zigzag and expanded shape, it may be configured by combining a hydraulic cylinder or a rail system made of profiles.

Figure 3:
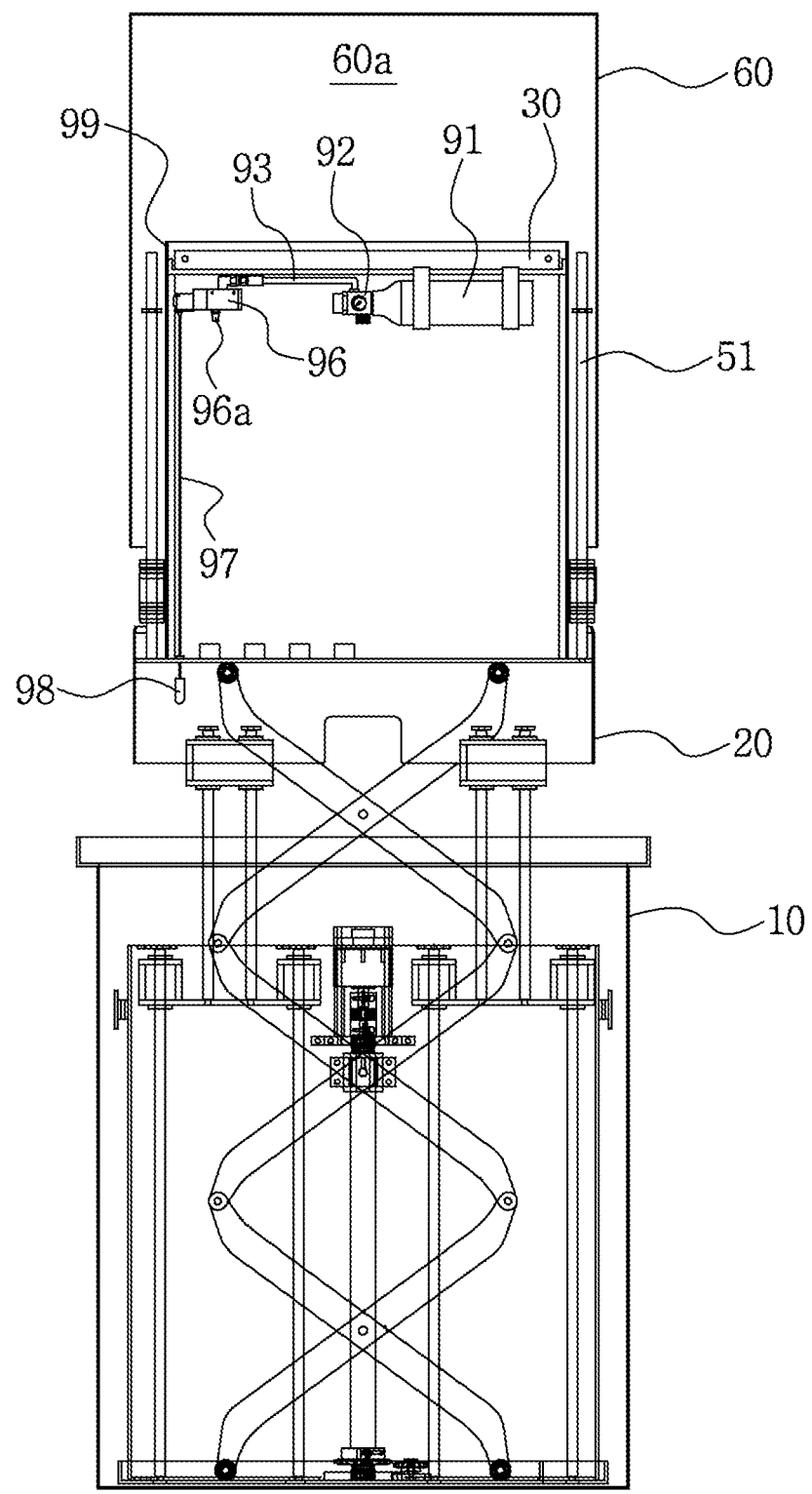
FIGS. 3 to 5 are views showing an example of an installation and use state of an air discharge means according to the present invention.

In addition, as shown in FIG. 3, the lower support 20 is formed in a "Π" shape having a sealed top side considering convenience of manufacturing, as well as installing other components including a flood detection sensor 98.

On the other hand, as shown in FIG. 3, an upright panel 30 fixedly provided in the form of a vertical panel is provided on the top of the lower support 20. At this point, although not shown, an electronic operating device of the control panel is coupled to the lateral side of the upright panel 30, and this is to allow handling and maintenance of the electronic operating device.

In addition, guide bars 51 are vertically provided to be spaced apart from each other on both sides in the horizontal length direction of the upright panel 30, and an inner box 60 is provided to slide up and down in the vertical direction along the guide bars 51.

The inner box 60 is provided to prevent inflow of moisture or water into the electronic operating device including the controller coupled to the upright panel 30, i.e., to protect the electronic operating device from moisture or water, and more specifically, as shown in FIGS. 2 and 3, as the inner box 60 vertically moves downward along the guide bars 51, the upright panel 30 is protected inside the accommodation unit 60a of the inner box 60, and as the inner box 60 vertically moves upward along the guide bars 51, the upright panel 30 is exposed from the accommodation unit 60a of the inner box 60 so that handling and maintenance of the electronic operating device coupled to the lateral side of the upright panel 30 are possible. As the inner box 60 is formed in a "Π" shape having an open bottom side and closed lateral and top sides to surround the outer side of the lower support 20 while descending so that an air pocket is formed inside the accommodation unit 60a, inflow of rainwater or groundwater into the inner box 60 is prevented in a state where the inner box 60 has moved to the lower side, and therefore, the electronic operating device of the control panel coupled to the lateral side of the upright panel 30 is protected from moisture or water.

The inner box 60 is formed in a "Π" shape with an open bottom side and closed lateral and top sides, i.e., in the shape of a cup upside down, so that an air pocket is formed inside the accommodation unit 60a.

Figure 2A:
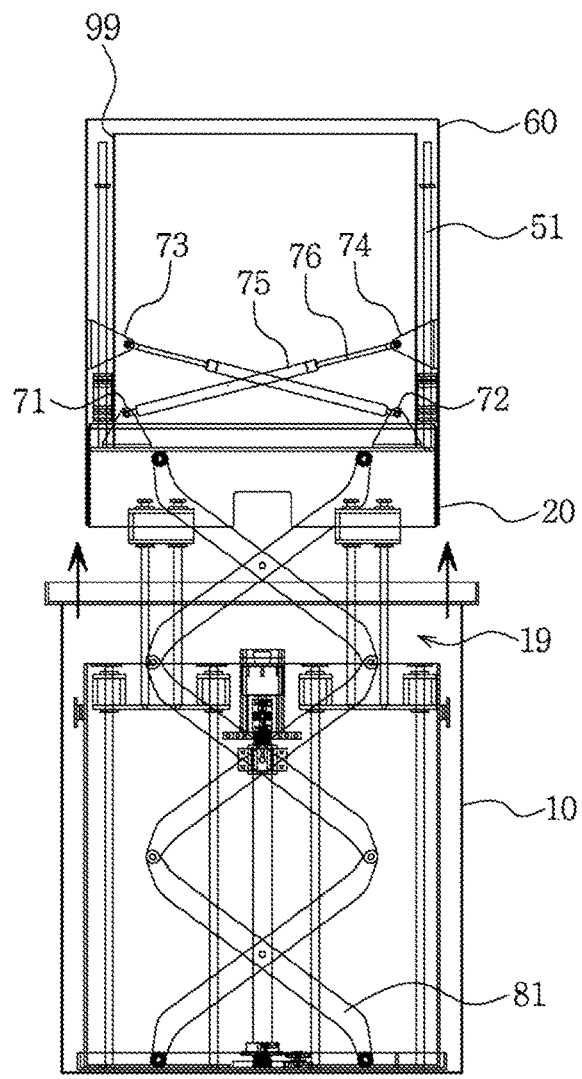
FIGS. 2A-2B are views showing an example of an elevating operation state of an inner box according to the present invention.
Figure 2B:
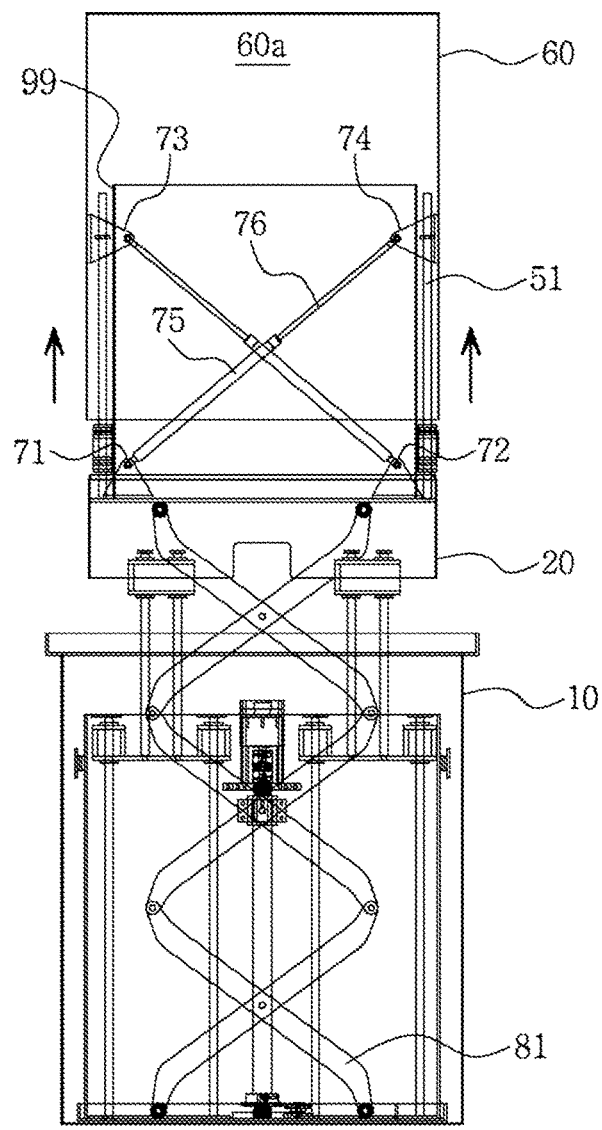

At this point, as for the elevating operation of the inner box 60, it is preferable to configure, as shown in FIGS. 2A-2B, to connect the cylinders 75 in a direction of diagonally crossing the hinges 71 to 74 up and down, while lower hinges 71 and 72 are provided on both sides of the rear side wall of the lower support 20, and upper hinges 73 and 74 are provided on both sides of the upper portion on the rear side wall of the inner box 60, so that the inner box 60 may be raised and lowered by the operation of the rods 76 of the cylinders 75.

Figure 6A:
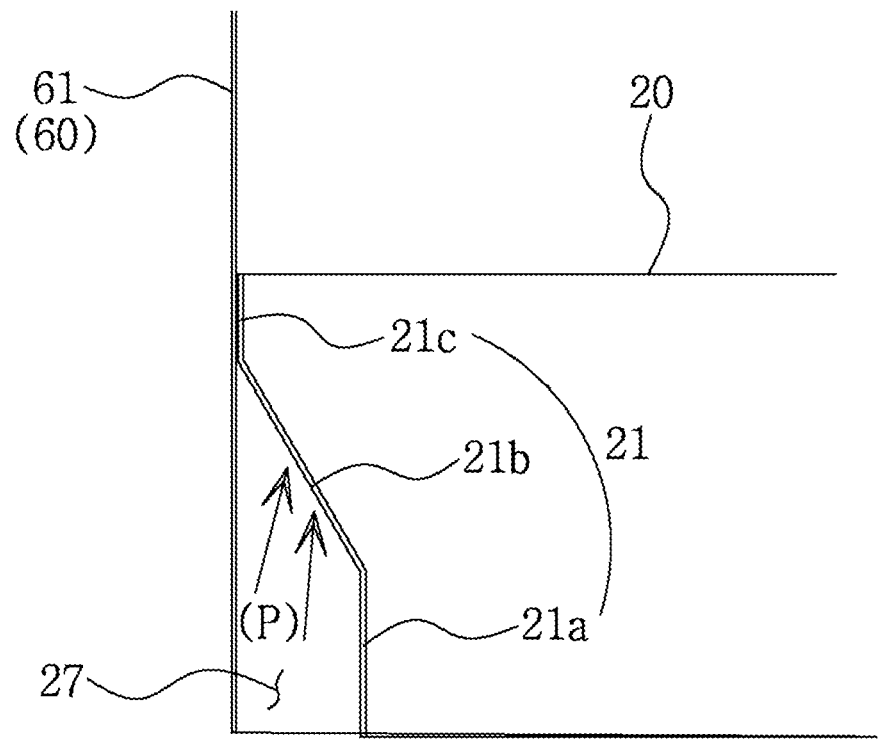
FIGS. 6A-6B and 7 are views showing another modified example according to the present invention

The air pocket function may be strengthened by the structure of the inner box 60 and the lower support 20. For this purpose, a side wall 21 of the lower support 20 is formed to be 10 to 25 Cm to prevent water or moisture from flowing into the side wall 21 of the lower support 20 from the outside of the inner box 60, and as another embodiment, the side wall 21 of the lower support 20 is formed of, as shown in FIG. 6A a lower side wall 21a extended from the bottom side toward the vertical top side, an inclined side wall 21b formed to be inclined upward from the top of the lower side wall 21a toward the outside and tightly attached to the inner side of the side wall 61 of the inner box 60, and an extended side wall 21c vertically extended from the top of the inclined side wall 21b along the side wall 61. As an internal pressurizing space unit 27 is formed between the inclined side wall 21b and the lower side wall 21a, and the side wall 61 of the inner box 60, the air pocket function is strengthened due to pressurization of the internal pressurizing space unit 27.

Figure 7:
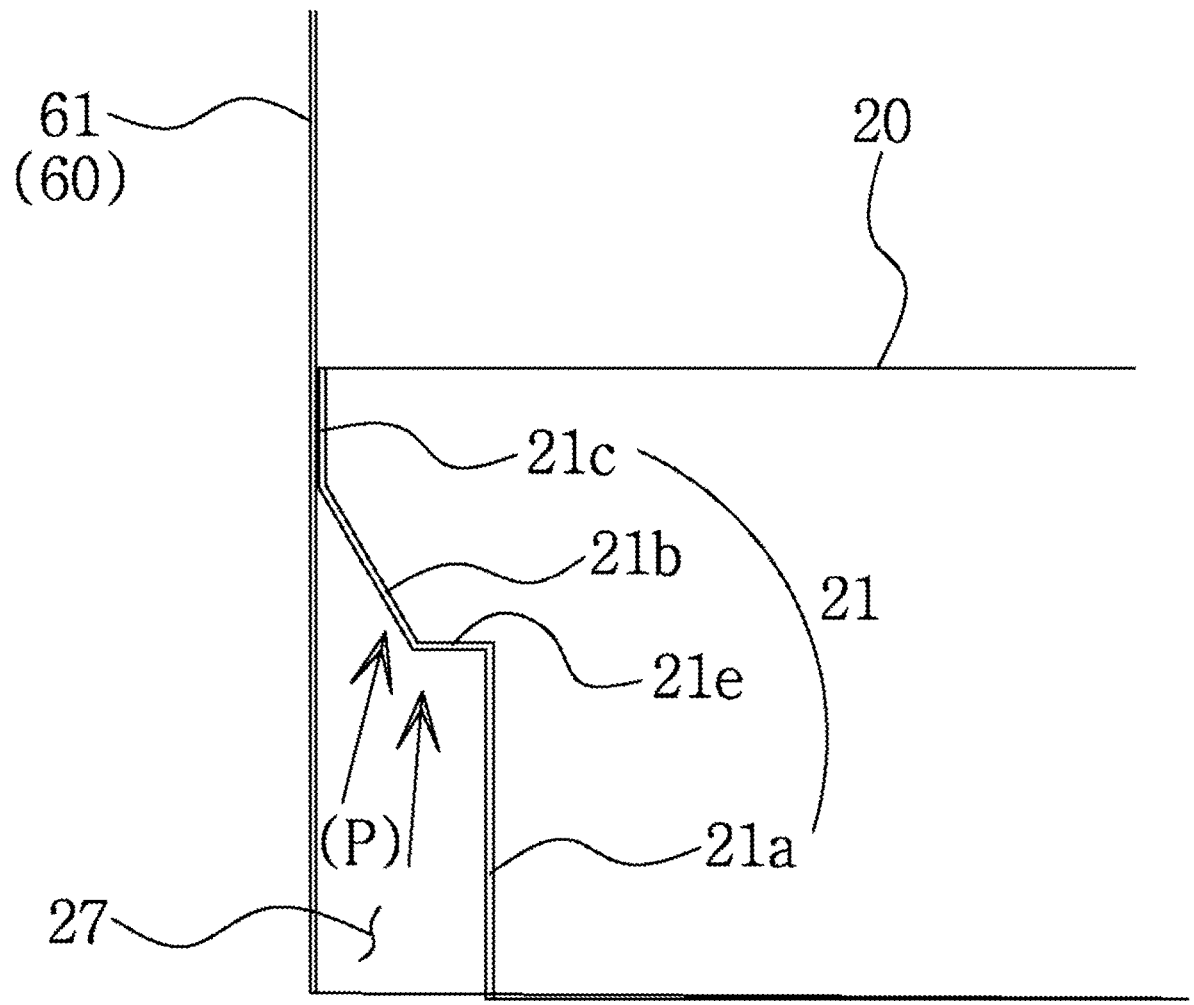

At this point, when a horizontal side wall 21e is further formed between the lower side wall 21a and the inclined side wall 21b as shown in FIG. 7 as a modified embodiment for further strengthening the air pocket function generated by the structure of the inner box 60 and the lower support 20, pressurizing performance of the internal pressurizing space unit 27 may be further increased. In addition, although not shown, when a protrusion and depression structure of a wave form is continuously formed on the horizontal side wall 21e, the pressurizing performance may be further increased in the depressions.

In addition, as a modified embodiment for further strengthening the air pocket function generated by the structure of the inner box 60 and the lower support 20, although not shown, a protrusion and depression structure of a thread form may be formed on the tightly attached sides of the extended side wall 21c and the side wall 61 facing each other so that the extended side wall 21c and the side wall 61 may be alternately and tightly attached to each other.

Figure 6B:
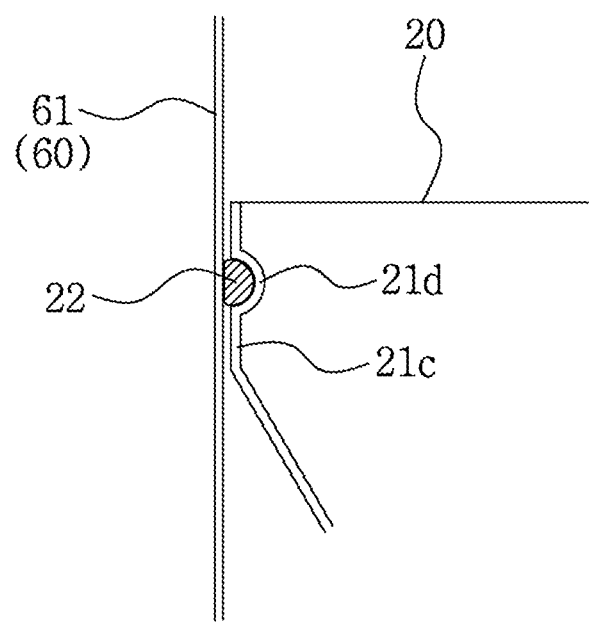

In addition, as shown in FIG. 6B, it may be configured to form a sealing member 22 to protrude on the outer side of the extended side wall 21c facing the side wall body 61. At this point, when an inward groove unit 21d is formed on the extended side wall 21c to fix the position of the sealing member 22, and then the sealing member 22 is provided to protrude from the inward groove unit 21d toward the outside, the effect of preventing inflow of water or moisture can be maximized.

Figure 4:
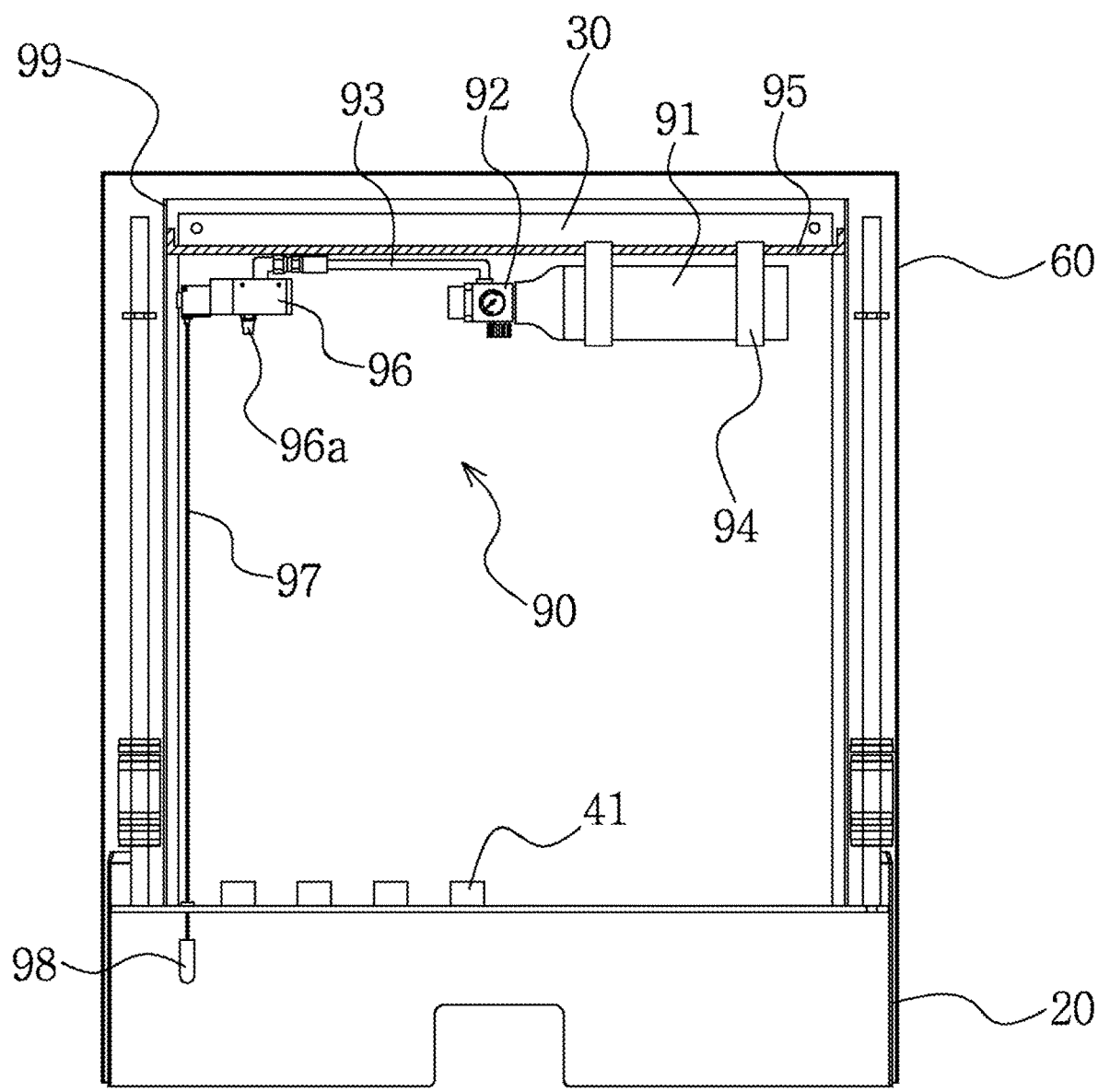

Meanwhile, as shown in FIGS. 3 and 4, the protection panel 99 vertically installed on the lower support 20 inside the inner box 60 is provided to protect the lateral side of the upright panel 30 provided on the lower support 20. At this point, the protection panel 99 is formed in a "⊏" shape having open top and front sides and closed rear and both lateral sides, and the upper end of the protection panel 99 is positioned to be higher than the upper end of the upright panel 30.

Figure 5:
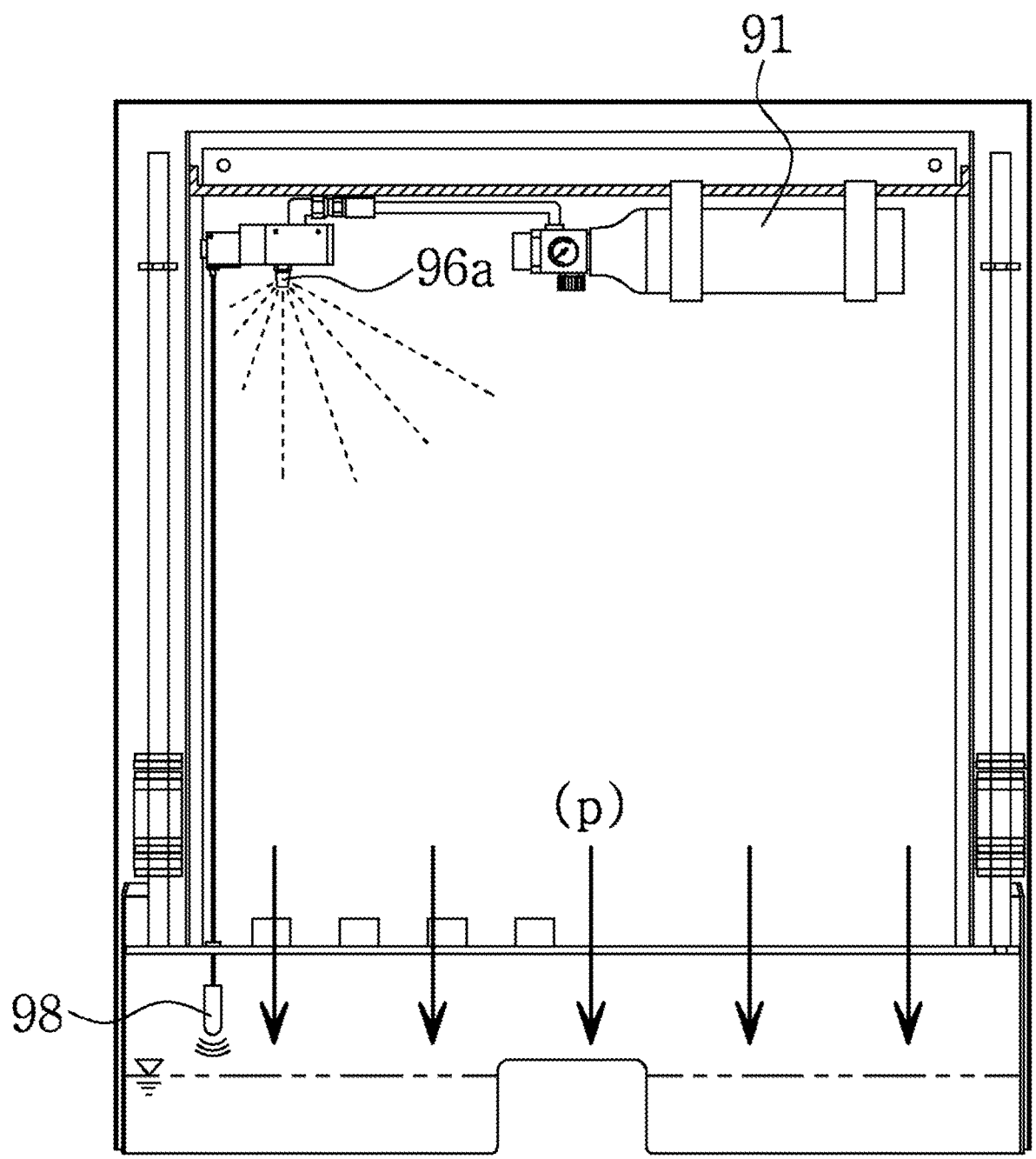

Then, as shown in FIGS. 3 and 4, the air discharge means 90 is fixedly provided inside the upper end of the protection panel 99. The air discharge means 90 is a means for discharging air to push out the water flowing in from the bottom side of the inner box 60 with air pressure when flooding occurs inside the inner box 60, and is configured of, as an embodiment, an air compression tank 91 for storing compressed air, a pressure reducer 92 connected to the inlet and outlet side of the air compression tank 91, a solenoid valve 96 connected to the pressure reducer 92 through a hose 93, a flood detection sensor 98 connected to an electric wire 97 to transfer a flood detection signal to the solenoid valve 96, and an injection nozzle 96a connected to the bottom side of the solenoid valve 96 to inject and discharge air toward the inside of the inner box 60. When one solenoid valve 96 provided with the injection nozzle 96a is installed, it is preferable to inject the air diagonally downward from one side of the upper edge of the inner box 60 as shown in FIG. 5. However, when the air is simultaneously injected in the diagonally downward directions facing each other from both sides of the upper edge of the inner box 60, the air discharge means 90 may be implemented more effectively.

As an embodiment of a more detailed installation configuration of the air discharge means 90, as shown in FIG. 4, a horizontal support 95 connecting the upper end portions on both sides of the protection panel 99 is provided, and the air compression tank 91 is fixedly provided on the horizontal support 95. At this point, it is preferable that the air compression tank 91 is fixed on the top or bottom side of the horizontal support 95, and the air compression tank 91 and the horizontal support 95 are integrally coupled using a plurality of fixing bands 94 to fix the air compression tank 91.

The air compression tank 91 is an embodiment, and although it will vary according to the amount of water flowing into the inner box 60 including the lower support 20, when the water flows in within an expected normal range, it is preferable to use an air compression tank 91 filled with air as much as to withstand inflow of water for at least 6 to 24 hours, and since a maintenance work is performed when a manager (repair worker) arrives within the 6 to 24 hours, an air compression tank 91 filled with air as much as an amount that can secure the time until the manager arrives should be used.

Then, the solenoid valve 96 is fixed on the upright panel 30 tightly attached to the front side of the protection panel 99 using bolts or other fixing means, and the flood detection sensor 98 is provided to be spaced apart from the bottom side of the upper plate 29 of the lower support 20. At this point, the flood detection sensor 98 is installed to detect flooding in the accommodation space of the lower support 20 formed in a "Π" shape, and a contact sensor or a non-contact sensor is installed and used according to design requirements, so that a double safety structure is implemented against flooding by transferring a flood detection signal to the solenoid valve 96 through the electric wire 97 when flooding in the accommodation space of the lower support 20 is detected by the flood detection sensor 98, discharging the air in the air compression tank 91 by opening the injection nozzle 96a of the solenoid valve 96, and pushing the water flowing into the inner box 60 including the lower support 20 to the outside using the internal pressure of the discharged air.

In addition, when the flood detection sensor 98 detects flooding, the flood detection signal is transferred to a computer or a portable terminal of the manager through wireless communication.

Unexplained reference numeral 41 is an electric wire entry and exit hole through which the electric wire passes.

According to the pull-out type buried underground field monitoring control panel with a flood double safety structure of the present invention described above, it is allowed to control in a pull-out type manner by burying a control panel for controlling traffic lights, street lights, or water supply pipes in the ground, protect various types of electronic devices from moisture or water in the ground using a double sealing structure based on an air pocket principle, and have a double safety structure against flooding by generating internal pressure at a dangerous time point and applying the pressure to the water flowing into the inner box to push it out of the inner box although the air pocket function is degraded as an abnormal condition occurs in the structure of a "Π" shape due to long-time flooding.

Although the present invention has been described above with reference to an embodiment shown in the drawings, this is only an example, and it should be clearly noted that various modifications and equivalent other embodiments are possible from the embodiment by those skilled in the art. Accordingly, the true technical protection scope of the present invention should be construed by the appended claims, and all technical spirits within a scope equivalent thereto should be construed as being included in the scope of the present invention.

National R&D Project which Supported this Invention
Project Identification Number 1425156584
Project Number 53174988
Name of Department Ministry of SMEs and Startups
Name of (Professional) Project Managing Institute Korea Technology and information Promotion Agency for SMEs
Research Project Name Small and Medium Business Commercialization Technology Development (R&D)
Detailed Research Project Name Development of Underground Control Panel with AR Air Pocket Technology
Contribution Rate 1/1
Name of Entity Performing the Task DAESAN ELECTRIC COMMUNICATION CO., LTD.
Research Period 2021 Sep. 6-2022 Sep. 5

DESCRIPTION OF SYMBOLS

| | |
|---|---|
| 10: Enclosure | 11: Cover |
| 19: Accommodation space | 20: Lower support |
| 30: Upright panel | 51: Guide bar |
| 60: Inner box | 60a: Accommodation unit |
| 81: Lifting member | 90: Air discharge means |
| 99: Protection panel | |

What is claimed is:

1. A pull-out type buried underground field monitoring control panel with a flood double safety structure, the control panel comprising:
   an enclosure 10 formed and buried in the ground in a shape of a housing having a top side of an open shape and opened or closed by a cover 11, and installed to be positioned on the same horizontal line as the ground;
   a lower support 20 located on a lower side of an accommodation space 19 of the enclosure 10, formed in a "Π" shape with a closed top side, and vertically moved up and down by a lifting member 81 provided on a bottom side of the enclosure 10;
   an upright panel 30 fixedly provided in a form of a vertical panel on a top of the lower support 20, wherein an electronic operating device of the control panel including a controller is coupled to a lateral side of the upright panel 30;
   guide bars 51 vertically provided to be spaced apart from each other on both sides of the upright panel 30 in a horizontal length direction;
   an inner box 60 provided to slide up and down in the vertical direction along the guide bars 51, wherein as the inner box 60 vertically moves downward along the guide bars 51, the upright panel 30 is protected inside an accommodation unit 60a of the inner box 60, and as the inner box 60 vertically moves upward along the guide bars 51, the upright panel 30 is exposed from the accommodation unit 60a of the inner box 60 so that handling and maintenance of the electronic operating device coupled to the lateral side of the upright panel 30 are possible, and as the inner box 60 is formed in a "Π" shape having an open bottom side and closed lateral and top sides to surround an outer side of the lower support 20 while descending so that an air pocket is formed inside the accommodation unit 60a, inflow of rainwater or groundwater into the inner box 60 is prevented in a state where the inner box 60 has moved to the lower side, and therefore, the electronic operating device of the control panel coupled to the lateral side of the upright panel 30 is protected from moisture or water;

a protection panel 99 vertically installed on the lower support 20 inside the inner box 60 to protect the lateral side of the upright panel 30, wherein an upper end of the protection panel 99 is positioned to be higher than an upper end of the upright panel 30; and an air discharge means 90 fixedly provided inside the upper end of the protection panel 99 to push out the water flowing in from a bottom side of the inner box 60 with air pressure when flooding occurs inside the inner box 60, wherein the air discharge means 90 includes an air compression tank 91 for storing compressed air, a pressure reducer 92 connected to the inlet and outlet side of the air compression tank 91, a solenoid valve 96 connected to the pressure reducer 92 through a hose 93, a flood detection sensor 98 connected to an electric wire 97 to transfer a flood detection signal to the solenoid valve 96, and an injection nozzle 96a connected to the bottom side of the solenoid valve 96 to inject and discharge air toward the inside of the inner box 60, wherein the inner box 60 is raised or lowered by an operation of rods 76 of cylinders 75 by connecting the cylinders 75 in a direction of diagonally crossing hinges 71 to 74 up and down while lower hinges 71 and 72 are provided on both sides of the rear side wall of the lower support 20, and upper hinges 73 and 74 are provided on both sides of the upper portion on the rear side wall of the inner box 60, wherein the protection panel 99 is formed in a "⊏" shape having open top and front sides and closed rear and both lateral sides, a horizontal support 95 connecting upper end portions on both sides of the protection panel 99 is provided, the air compression tank 91 is fixedly provided on the horizontal support 95, the solenoid valve 96 is fixed on the upright panel 30 tightly attached to a front side of the protection panel 99, and the flood detection sensor 98 is provided to be spaced apart from the bottom side of an upper plate 29 of the lower support 20.

2. The control panel according to claim 1, wherein a side wall 21 of the lower support 20 is formed at a height of 10 to 25 Cm to include:

a lower side wall 21a extended from the bottom side toward the vertical top side;

an inclined side wall 21b formed to be inclined upward from the top of the lower side wall 21a toward the outside and tightly attached to the inner side of the side wall 61 of the inner box 60; and an extended side wall 21c vertically extended from the top of the inclined side wall 21b along the side wall 61, wherein as an internal pressurizing space unit 27 is formed between the inclined side wall 21b and the lower side wall 21a, and the side wall 61 of the inner box 60, the air pocket function is strengthened due to pressurization of the internal pressurizing space unit 27.

3. The control panel according to claim 2, wherein a sealing member 22 is formed to protrude on the outer side of the extended side wall 21c facing the side wall body 61, an inward groove unit 21d is formed on the extended side wall 21c to fix the position of the sealing member 22, and the sealing member 22 is provided to protrude from the inward groove unit 21d toward the outside, and it is configured to form a through hole on the cover 11, position an antenna capable of communication with the outside in the through hole, and then fill epoxy in the through hole so that the antenna is embedded, and the antenna is configured to be electrically connected to the controller coupled to the lateral side of the upright panel 30 to allow communication from the outside.

\* \* \* \* \*